(12) United States Patent
Johnson

(10) Patent No.: US 7,458,182 B2
(45) Date of Patent: Dec. 2, 2008

(54) LIVE CATCH RODENT TRAP

(75) Inventor: Daniel C. Johnson, Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 41 days.

(21) Appl. No.: 11/564,366

(22) Filed: Nov. 29, 2006

(65) Prior Publication Data

US 2008/0120896 A1    May 29, 2008

(51) Int. Cl.
*A01M 23/08* (2006.01)
(52) U.S. Cl. .......................................................... 43/67
(58) Field of Classification Search ...................... 43/66, 43/67, 61
See application file for complete search history.

(56) References Cited

U.S. PATENT DOCUMENTS

| | | | |
|---|---|---|---|
| 786,949 A | 4/1905 | Bumann | |
| 1,226,641 A * | 5/1917 | Cushing | 43/60 |
| 1,581,297 A * | 4/1926 | Schmuck | 43/60 |
| 1,635,224 A * | 7/1927 | Rowley | 43/69 |
| 1,703,990 A * | 3/1929 | Daniels | 43/61 |
| 1,760,729 A | 5/1930 | Warner | |
| 2,023,427 A | 12/1935 | Laughlin | |
| 2,475,462 A * | 7/1949 | Rosen | 43/61 |
| 2,655,759 A * | 10/1953 | Cronberger | 43/60 |
| 2,774,175 A | 12/1956 | Maddocks | |
| 2,885,820 A * | 5/1959 | Maggio | 43/61 |
| 3,177,608 A | 4/1965 | Lindelow | |
| 3,786,591 A | 1/1974 | Morford | |
| 3,975,857 A | 8/1976 | Branson et al. | |
| 4,232,472 A | 11/1980 | Muelling | |
| 4,291,486 A | 9/1981 | Lindley | |
| 4,550,523 A * | 11/1985 | Spiller | 43/61 |
| 4,578,892 A * | 4/1986 | Melton | 43/60 |
| 4,744,170 A | 5/1988 | Chow | |
| 4,768,305 A * | 9/1988 | Sackett | 43/61 |
| 5,452,539 A * | 9/1995 | Kurosawa et al. | 43/58 |
| 5,720,125 A * | 2/1998 | Oviatt | 43/61 |
| 6,564,501 B1 * | 5/2003 | Schislyonok | 43/61 |
| 6,694,669 B2 | 2/2004 | Gehret et al. | |

* cited by examiner

*Primary Examiner*—Kurt Rowan
(74) *Attorney, Agent, or Firm*—Stiennon & Stiennon

(57) ABSTRACT

A live catch rodent trap has a tubular housing which is sealed at a far end by a removable end cap. A door is pivotably mounted to a near end of the housing, and alternately permits entrance to the housing through a front opening when the door is propped open, and closes the front opening when the trap is actuated by a rodent passing into housing and past a midpoint of the housing. The housing is pivotably mounted to a shroud which surrounds the rear portion of the housing to prevent inadvertent activation of the trap from the exterior.

8 Claims, 3 Drawing Sheets

LIVE CATCH RODENT TRAP

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to live catch rodent traps.

Mechanical rodent traps are known which employ a tubular housing which is supported on a central pivot member. A pivoting door is connected adjacent a front opening of the housing in such a way that the door is propped open to reveal the housing when the housing is tilted towards the front opening. A mouse entering the tube causes the housing to pivot and the door to close in a latched fashion, thereby capturing the rodent without necessarily killing it. The captured rodent may then be disposed of at a later time. This type of trap is subject to being actuated by a rodent climbing on or otherwise contacting the housing from the outside. Once actuated the trap is no longer available to capture rodents.

What is needed is a mechanical live catch rodent trap which is less susceptible to being actuated from its exterior.

SUMMARY OF THE INVENTION

The live catch rodent trap of the present invention has a tubular housing which is sealed at one end by a removable end cap. A door is pivotably mounted to the near end of housing, and alternately permits entrance to the housing (when the trap is set) and closes the housing (when the trap is actuated). The housing is pivotably mounted to a shroud which surrounds the rear portion of the housing to prevent inadvertent activation of the trap from the exterior.

It is an object of the present invention to provide a live catch rodent trap which is activated by the reception therein of a rodent, but which resists actuation by contact by a rodent from the exterior of the housing.

Further objects, features and advantages of the invention will be apparent from the following detailed description when taken in conjunction with the accompanying drawings.

DESCRIPTION OF THE PREFERRED EMBODIMENTS

Figure 1:
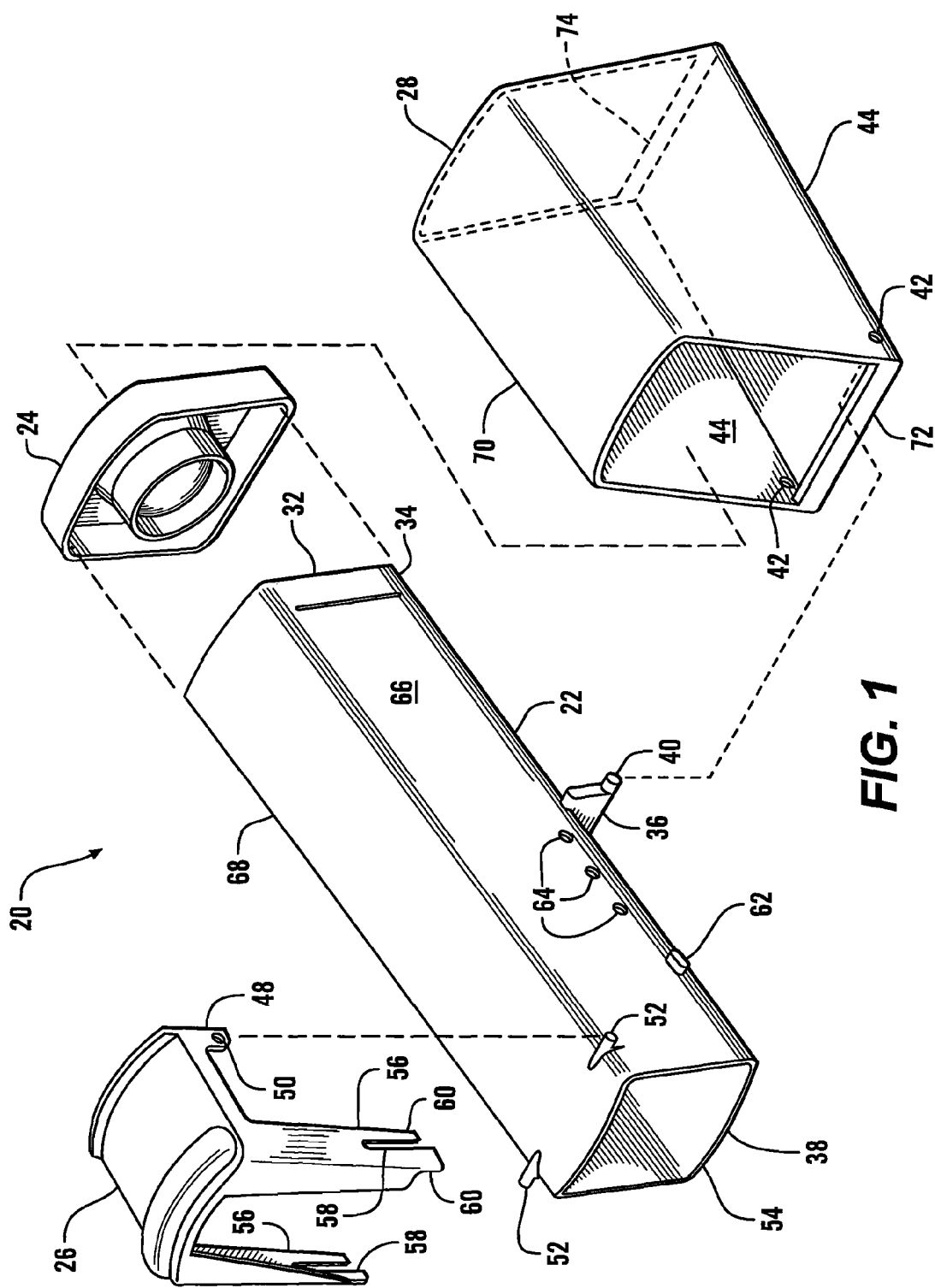
FIG. 1 is an exploded isometric view of the rodent trap of this invention.

Referring more particularly to FIGS. 1-4 wherein like numbers refer to similar parts, a live catch rodent trap 20 is comprised of four molded plastic parts. A tubular housing 22 is sealed at one end by a removable end cap 24. A front opening 54 is located at the near end of the housing. The front opening is alternately revealed (when the trap is set) and sealed (when the trap is activated) by a pivotably mounted door 26. The housing 22 is pivotably mounted to a shroud 28 which surrounds the rear portion of the housing to prevent inadvertent activation of the trap.

Figure 2:
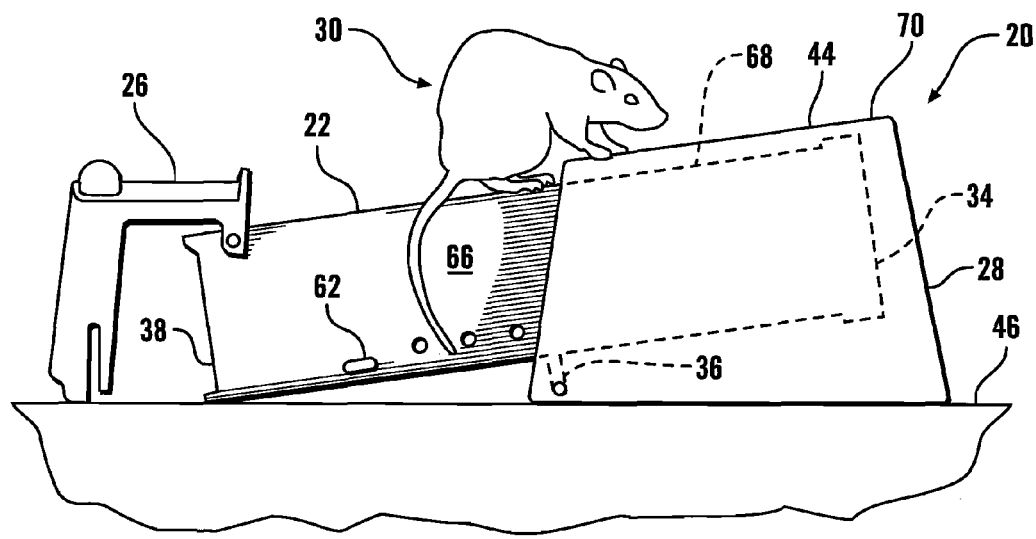
FIG. 2 is a side elevational view of the device of FIG. 1, showing a rodent climbing thereon without activating the trap.
Figure 3:
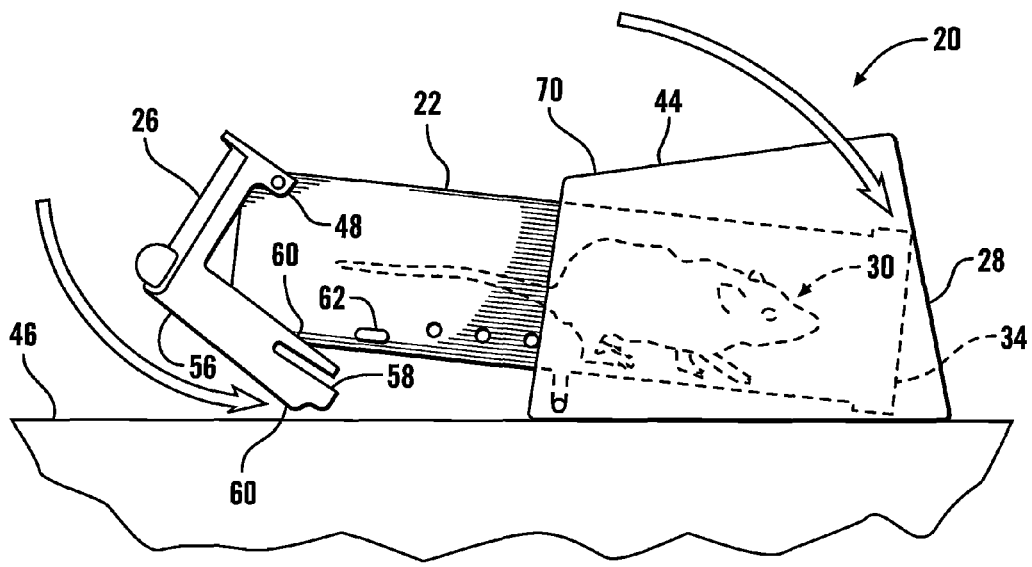
FIG. 3 is a side elevational view of the device of FIG. 2, showing a rodent activating the trap by crossing the pivot axis.

The housing 22 is a generally square tube, dimensioned to admit a targeted rodent 30 therein, such as a mouse as shown in FIG. 3. For purposes of clarity, the shroud 28 is shown with smooth walls; however, it should be noted that ribs may be provided which extend across the shroud to increase the stiffness thereof. The shroud 28 should be stiff enough to support the weight of a rodent thereon without sagging to contact the housing 22. The housing 22 has a rear opening 32 at a far end 34 which in most situations is closed by the end cap 24. A bait element, not shown, may be placed at the far end of the housing to entice a rodent to enter. The end cap 24 engages with the housing in a friction fit to close off the rear opening 32 and to prevent the escape of a rodent therethrough. As shown in FIG. 1, a pivot member 36 extends downwardly from the housing 22 at a point about midway between the far end 34 and the near end 38. Two pins 40 extend sidewardly from the pivot member 36 of the housing 22 and are freely received into pivot mounting holes 42 formed in the side walls 44 of the shroud 28. The housing 22 is thus pivotably mounted to the shroud 28. The pivot member 36 is located on the housing such that when the door 26 is in a set position, as shown in FIG. 2, the housing pivots forwardly such that the near end 38 engages a support surface 46 such as a building floor or the ground, on which the shroud 28 also rests. In this set position, the far end 34 is elevated from the support surface, but is covered by the shroud 28.

As best shown in FIG. 1, the door 26 has two rearwardly extending tabs 48, each with a mounting hole 50 formed therein. The mounting holes 50 receive door mounting pins 52 which extend sidewardly from the housing 22 on either side of the front opening 54 at the near end 38. The door 26 has two rearwardly extending arms 56 spaced to receive the housing therebetween. Each arm 56 has two rearwardly extending members 60 which are closely spaced to define a rearwardly opening slot 58. In the set position, shown in FIG. 2, the rearwardly extending members 60 engage the support surface 46 and prop the door 26 open, allowing free access to the interior of the housing 22 by a rodent 30. To facilitate the smooth closing of the door along the sides of the housing, each narrow member 60 which is closer to the top of the housing in the closed position is preferably tapered such that the member narrows as it extends to its end, such that it is thinner at the point where it first contacts the nubbin 62 than at the base of the slot 58.

Figure 4:
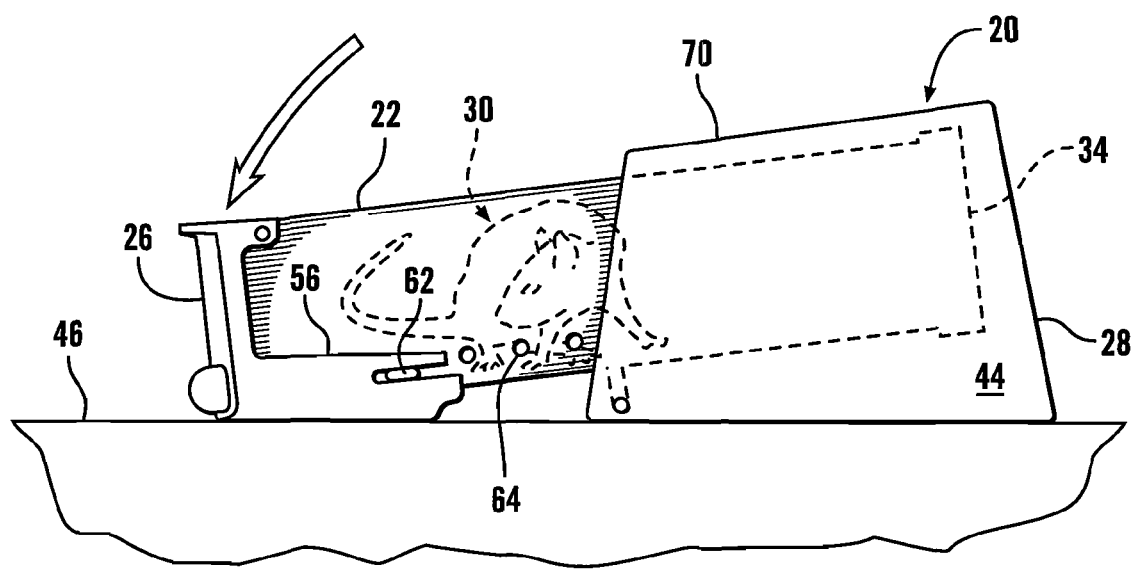
FIG. 4 is a side elevational view of the device of FIG. 3, showing a rodent trapped therein.

When a rodent 30 enters the housing 22 through the front opening 54 and progresses along the housing interior past the pivot member 36, the weight of the rodent causes the housing to pivot on the pivot member 36 thereby raising the near end 38 of the housing from contact with the support surface 46. As shown in FIG. 3, once the near end 38 is raised, the arms 56 of the door 26 no longer engage the support surface, and the door then pivots rearwardly to bring the arms beneath the housing where the arm members 60 engage nubbins 62 which protrude sidewardly from the housing. The nubbins 62 once engaged within the slots 58 are not readily dislodged, and the door is thus securely closed on the housing, trapping the rodent therein, as shown in FIG. 4. Air holes 64 may be provided in the side walls 66 of the housing or elsewhere to provide air for the captured rodent until time of disposal. To dispose of the rodent the entire trap 20 may be taken to a place of disposal, and the end cap 24 removed, and the rodent dislodged from the smooth housing interior.

It will thus be observed that the trap will be activated whenever sufficient force is applied to the rear portions 68 of the housing to lift the near end sufficiently to allow the door to pivot closed. These rear portions 68, which comprise those portions of the housing which are rearward of a plane which extends vertically upwardly from the pivot member pins 40, are protected from contact from the outside by the shroud 28. As shown in FIG. 2, the shroud 28 has a top wall 70 which extends between the two downwardly extending side walls 44. As shown in FIG. 1, the shroud has a front strut 72 which connects the two side walls 44 frontwardly of the pivot member 36, and a rear strut 74 which connects the side walls rearwardly of the housing. The housing 22 need not have a bottom wall. Thus the housing is positioned between the two side walls, with the shroud top wall extending to overlie the rear portions of the housing between the pivot member and the housing far end, the housing serving to restrict access to the rear portions of the housing to thereby prevent actuation of the trap from the exterior of the housing. As shown in FIG. 2, the top wall 70 of the shroud 28 is inclined upwardly from the front to the back, so as to allow the free pivoting of the housing 22 within the shroud. The side walls of the shroud are thus taller where they are closer to the far end of the housing.

As shown in FIG. 2, if a rodent climbs on the trap 20, it is not able to apply a downward force to the rear portions of the housing which would activate the trap. This increases the possibility of successfully trapping a rodent, because once the trap is activated, it can no longer admit a rodent therein. The trap 20 allows a rodent to engage the trap multiple times, even to climb over it, without actuation.

It is understood that the invention is not limited to the particular construction and arrangement of parts herein illustrated and described, but embraces all such modified forms thereof as come within the scope of the following claims.

I claim:

1. A rodent trap comprising:
   a tubular housing, having a near end through which a rodent may enter, and a far end which is closed;
   a door pivotably mounted to the housing, the door being pivotable between a first position in which the near end of the housing is revealed to allow the entrance of a rodent into the housing, and second position in which the door covers the near end in a latched position to restrict the escape of a rodent from within the housing; and
   a shroud having a top wall, and two side walls which extend downwardly from the top wall, the housing being pivotably mounted about a pivot member to the shroud such that the housing is positioned between the two side walls, wherein the housing near end extends from the shroud and projects outwardly beyond the shroud side walls, and wherein the shroud top wall extends to overlie rear portions of the housing between the pivot member and the housing far end, the shroud serving to restrict access to the rear portions of the housing to thereby prevent actuation of the trap from the exterior of the housing.

2. The rodent trap of claim 1 wherein the shroud top wall inclines upwardly as it extends away from the door, so as to allow the free pivoting of the housing within the shroud.

3. The rodent trap of claim 1 further comprising:
   pins which extend sidewardly from the pivot member; and
   portions of the shroud side walls which define two opposed mounting holes, the pins extending into the mounting holes to pivotably mount the housing to the shroud.

4. A rodent trap comprising:
   a tubular housing, having a near end, and portions defining a front opening sized to admit a rodent at the near end, the housing extending from the front opening to a far end spaced from the near end;
   a door pivotably mounted to the housing, the door being pivotable between a first position in which the front opening of the housing is revealed to allow the entrance of a rodent into the housing, and a second position in which the door covers the front opening to restrict the escape of a rodent from within the housing;
   a mounting member positioned beneath the housing, and having portions which extend sidewardly, the mounting member being located between the near end and the far end of the housing;
   a shroud having a top wall which extends over portions of the housing, the mounting member being pivotably connected to the shroud to permit the tilting of the housing between a position in which the near end is lower than the far end, and a position in which the far end is lower than the near end, wherein the shroud top wall overlies rear portions of the housing between the pivot member and the housing far end, the shroud serving to restrict access to the rear portions of the housing to thereby prevent actuation of the trap from the exterior of the housing.

5. The rodent trap of claim 4 wherein the shroud top wall inclines upwardly as it extends away from the door, so as to allow the free pivoting of the housing within the shroud.

6. The rodent trap of claim 4 wherein the shroud has two side walls which extend downwardly from the top wall, and further comprising:
   a front strut which extends between the two side walls beneath the housing; and
   a rear strut which extends between the two side walls beneath the housing.

7. The rodent trap of claim 4 further comprising:
   pins which extend sidewardly from the pivot member; and
   portions of the shroud located beneath the housing which define two opposed mounting holes, the pins extending into the mounting holes to pivotably mount the housing to the shroud.

8. A rodent trap comprising:
   a tubular housing, having a near end through which a rodent may enter, and a far end which is closed:
   a door pivotably mounted to the housing, the door being pivotable between a first position in which the near end of the housing is revealed to allow the entrance of a rodent into the housing, and second position in which the door covers the near end in a latched position to restrict the escape of a rodent from within the housing: and
   a shroud having a top wall, and two side walls which extend downwardly from the top wall, the housing being pivotably mounted about a pivot member to the shroud such that the housing is positioned between the two side walls, with the shroud top wall extending to overlie rear portions of the housing between the pivot member and the housing far end, the shroud serving to restrict access to the rear portions of the housing to thereby prevent actuation of the trap from the exterior of the housing, wherein the shroud further comprises: a front strut which extends between the two side walls beneath the housing; and a rear strut which extends between the two side walls beneath the housing.

* * * * *